United States Patent [19]

Sanderson

[11] 4,309,730
[45] Jan. 5, 1982

[54] METHOD OF READING AND/OR WRITING INFORMATION AND APPARATUS FOR CARRYING OUT THE METHOD

[75] Inventor: Hendrik J. Sanderson, Eindhoven, Netherlands

[73] Assignee: U.S. Philips Corporation, New York, N.Y.

[21] Appl. No.: 90,964

[22] Filed: Nov. 5, 1979

[30] Foreign Application Priority Data

Dec. 19, 1978 [NL] Netherlands ............... 7812286

[51] Int. Cl.³ .................................. G11B 21/10
[52] U.S. Cl. .......................... 360/77; 360/84; 360/109
[58] Field of Search ................. 360/77–78, 360/84–85, 106, 107–108, 109

[56] References Cited

U.S. PATENT DOCUMENTS 4,165,523  8/1979  Hathaway ................ 360/77
4,197,565  4/1980  Watanabe ................ 360/77

FOREIGN PATENT DOCUMENTS 2757400  6/1978  Fed. Rep. of Germany ........ 360/77
2846255  4/1979  Fed. Rep. of Germany ........ 360/77

Primary Examiner—John H. Wolff
Attorney, Agent, or Firm—Thomas A. Briody; William J. Streeter; Edward W. Goodman

[57] ABSTRACT

Method and apparatus for positioning magnetic heads in a two-head helical scan video recorder, suitable control signals being generated for making the heads follow the tracks by means of piezoelectric transducers. The control signals applied to the two transducers are compared and when these control signals deviate from each other more than to a predetermined extent the one transducer receives the same control signal as the other transducer, so as to ensure that the two heads follow consecutive tracks.

9 Claims, 3 Drawing Figures

METHOD OF READING AND/OR WRITING INFORMATION AND APPARATUS FOR CARRYING OUT THE METHOD

BACKGROUND OF THE INVENTION

The invention relates to a method of positioning heads for reading and/or writing information, which heads in turn consecutively follow recording tracks, which tracks are substantially parallel to each other and make an angle with the longitudinal axis of a recording medium in the form of a tape, and are respectively controlled in position by means of a first and a second transducer in a direction transverse to the direction of said recording tracks.

Such a method is known from Netherlands Patent Application No. 7409513, which has been laid open for public inspection. In apparatus in which information is recorded in adjacent tracks on a record carrier and is subsequently read, in particular apparatus for recording and reproducing video signals of the type in which the record carrier is passed around a drum in accordance with a helix and is scanned by a rotary head, it is essential that the read head precisely follows the desired track during reading. This is the more so as, in order to increase the information density, the distance between the tracks is constantly reduced and the tracks are even written directly against each other without any intermediate spacing, while at the same time the width of the tracks is reduced continually and track widths of approximately 30 μm are already used, the trend being to reduce these already extremely small track widths even further. A slight deviation of the read head from the correct track then immediately result in impermissible cross-talk of information from the adjacent track.

In accordance with this known method pilot signals written in the tracks are read and used for controlling the position of the reproducing head relative to the centre of the track being read by the relevant reproducing head.

A drawback of this known method is that the positional error may correspond to a full track or, in cases that the pilot signals within a group of tracks can be distinguished from each other, a number of tracks without this being detected. When the known method is used it may happen that a reproducing head is controlled to the centre of a wrong track.

SUMMARY OF THE INVENTION

It is the object of the invention to provide a method of positioning the reproducing heads relative to each other in such a way that they scan consecutive tracks.

To this end the invention is characterized in that a control signal, similar to the control signal applied to the second transducer, is applied to the first transducer if the positions of the two heads deviate from each other more than to a predetermined extent.

The invention is based on the recognition that, if the relationship between the control signals and the positions of the heads is sufficiently accurate, a tracking error may be corrected by applying the same control signal to both transducers, so that the two heads are controlled towards each other so closely that the tracking system can centre the two heads consecutively on consecutive tracks.

The Applicant's previously filed Netherlands Patent Application No. 7808639, corresponding to U.S. patent application Ser. No. 58,577, filed July 18, 1979, proposes a solution for the detection of a tracking error. For this purpose pilot signals are recorded in the recording tracks at equal time intervals from the beginning of each recording track, so that the pilot signals of every two consecutive recording tracks are situated at a nominal time interval, which for two-head video recorders is equal to half the revolution time of the head drive and equal to the duration of one video field. As the tracks are disposed obliquely, on the tape, the time difference between two pilot signals which are consecutively read depends on the number of tracks situated between two consecutively read tracks. By comparing this time difference with said nominal time interval the tracking error can be determined. This method of detecting a tracking error may be used in conjunction with the corrrection step in accordance with the present invention. However, this solution demands the use of comparatively many electronic components.

In respect of the detection of tracking errors with the method in accordance with the invention it is advantageous in comparison with the afore-mentioned solution that the position of the two heads relative to each other is guarded by comparing the control signals applied to the two transducers and that if the difference between the two control signals exceeds a predetermined value the control signal for the second transducer is derived from the control signal for the first transducer.

This step is based on the recognition that from the requirement that the relationship between the control signals and the positions of the heads should be sufficiently accurate, it follows that the difference between these control signals is a sufficiently accurate measure of the positions of these heads relative to each other.

The invention also relates to apparatus for carrying out the method, comprising a first and a second head for reading and/or writing information by in turn consecutively following recording tracks, which tracks are substantially parallel to each other and which make an angle with the longitudinal axis of a recording medium in the form of a tape, and comprising a first and a second transducer for respectively moving the first and the second head in a direction transverse to the direction of the recording tracks as a function of a first and a second control signal respectively, the apparatus furthermore comprising detection means for comparing the positions of the first and the second head relative to each other and detecting whether the difference between the positions of the first and the second head in a direction transverse to the direction of the recording tracks exceeds a predetermined value and correction means for applying a control signal corresponding to the second control signal to the first transducer when said difference exceeds a predetermined value.

In respect of the said detection means the apparatus in accordance with the invention may further be characterized in that the said detection means signal and to detect whether the difference between the first and the second control signals exceeds a predetermined value.

In respect of the correction means the apparatus in accordance with the invention may further be characterized by means for the detection of tracking signals recorded in the said recording tracks and consecutively read by the first and the second head, and for deriving therefrom the first and the second control signal, first and second storage means for the storage of the value of the first or the second control signal each time at the beginning of every period that the first or the second head respectively follows a recording track, and first switching means for applying the value stored in the first or the second storage element to the first or the second transducer respectively during the period consecutive to the period that the first or the second head respectively follows a recording track, said correction means being adapted to transfer the value stored in the second storage element to the first storage element after said detection means have detected that said predetermined values have been exceeded.

If this solution is adopted, a preferred embodiment of an apparatus in accordance with the invention may further be characterized in respect of the detection means in that said detection means comprise a differential amplifier for determining the difference between the value stored in the two storage elements and a threshold switch of which an input is connected to an output of the differential amplifier and an output is connected to said correction means.

In respect of the correction means this embodiment of the apparatus in accordance with the invention may be characterized in that the first and the second storage element respectively comprise a first and a second storage capacitance, which via second switching means is connected to an output of said means for detecting tracking signals recorded in the recording tracks and consecutively read by the first and the second head, for storing the value of the first and the second control signal respectively at the beginning of every period that the first or the second head respectively follows a recording track, and which first or second storage capacitance is connected to said first switching means via a first and a second isolation amplifier respectively, said correction means being constituted by a switch between the output of the first isolation amplifier and the input of the second isolation amplifier, which switch is actuated by the output signal of the threshold switch, and inputs of said differential amplifier being connected to outputs of the first and the second isolation amplifier.

In order to prevent instability it is furthermore advantageous to include a delay network between the differential amplifier and the threshold switch.

DESCRIPTION OF THE DRAWINGS

The invention is described in more detail with reference to the drawings, in which.

DESCRIPTION OF THE PREFERRED EMBODIMENT

Figure 1:
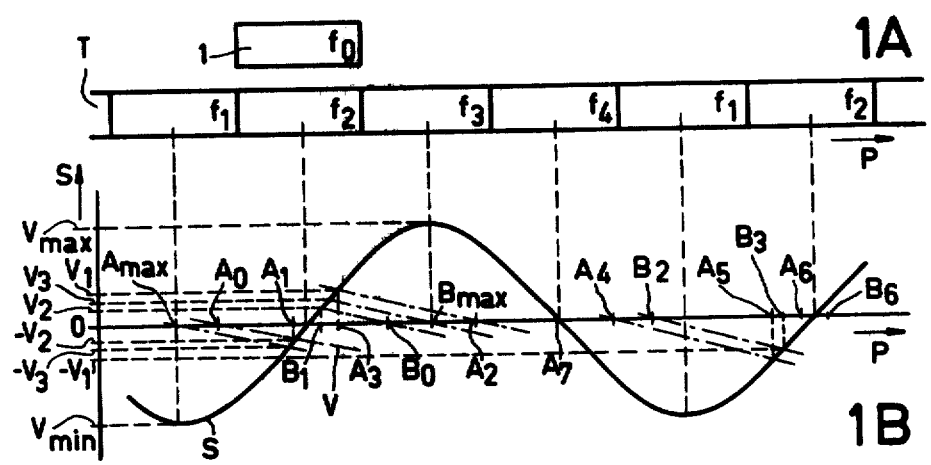
FIG. 1A schematically represents the sequence of tracking signals on a tape.
FIG. 1B represents the variation of a control signal as a function of the track being read.

FIG. 1A schematically represents the sequence of tracking signals consecutively having the frequencies f1, f2, f3 and f4 on a tape T. A head 1 reads said frequencies and these frequencies are mixed with a signal having a frequency f0. FIG. 1B represents the variation of a control signal S which is produced when a head 1, which should follow a track with a tracking frequency f2, the mixing frequency f0 being chosen correctly, in conformity therewith, is moved along the tape T in the direction P transverse to the track direction.

Figure 2:
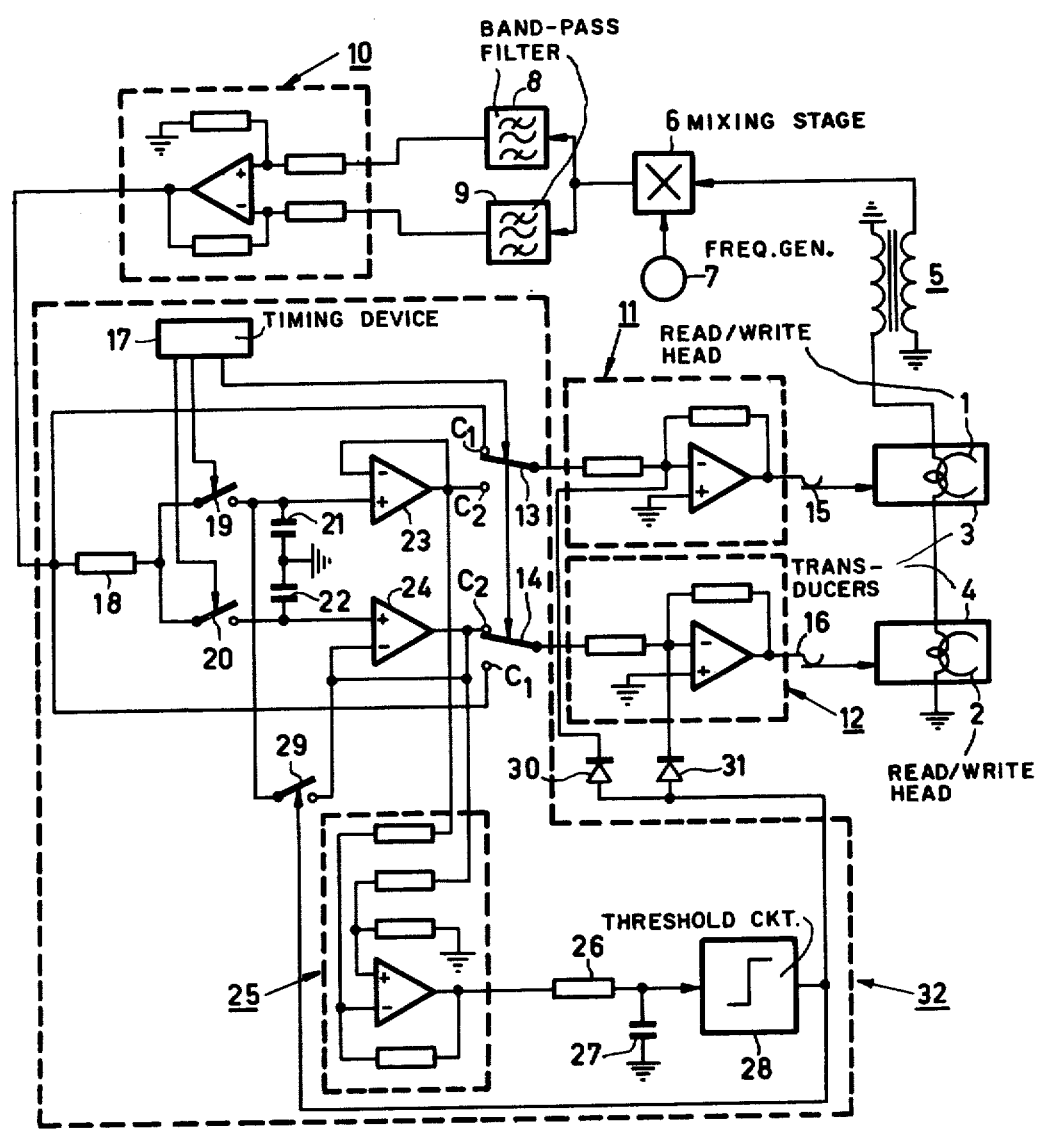
FIG. 2 shows the diagram of a preferred embodiment of an apparatus in accordance with the invention.

FIG. 2 shows the diagram of a tracking device in accordance with the invention. The heads 1 and 2 are secured to transducers 3 and 4, respectively, for adjusting the height position of the heads 1 and 2, respectively. The read coils of the heads 1 and 2 are connected in series and, via for example a rotary transformer 5, are connected to the input of a mixing stage 6, to which the output signal of a frequency generator 7 is also applied. The frequency f0 of the frequency generator 7 output signal changes after every track, so that, each time, a mixing frequency corresponding to the track to be read is applied to the mixing stage 6. From the output signal of the mixing stage 6 two specific mixing products are filtered out with the aid of band-pass filters 8 and 9. The difference of these mixing products is determined with an operational amplifier 10, connected as a subtractor circuit, which difference is the signal S shown in FIG. 1B.

If the head 1 should follow a track with a tracking frequency f2, frequency generator 7 generates a frequency f0 which, respectively, with the frequency f1 or f3 of the left-hand and right-hand adjacent tracks, yields a mixing product which is filtered out by band-pass filter 8 or 9, respectively. If head 1 exactly follows the track with a tracking frequency f2, the mixing products are equal in respect of amplitude and the signal S has a value of 0 V. If head 1 follows the track with the tracking frequency f1, the mixing product of the frequency f1 with the frequency f0 is a maximum and the signal S has a maximum negative value Vmin. If head 1 follows the track with the tracking frequency f3, the mixing product of the frequency f3 with the frequency f0 is a maximum and the signal S has a maximum value Vmax. If head 1 follows a track with the tracking frequency f4 the mixing products of the frequencies f1 and f3 with the frequency f0 are equal in amplitude and the signal S has the value 0 V. Thus the discrimination characteristic in accordance with FIG. 1B is obtained for the value of the signal S as a function of the head position P.

After head 1 has read the track with the tracking signal of the frequency f2, head 2 should read the next track with the tracking signal f3. The frequency f0 then changes in such a way that the mixing product with the frequency f2 or f4 is transmitted by the band-pass filter 9 or 8, respectively. A similar discrimination characteristic is then obtained, but shifted in the direction P over one track distance. Therefore it is correct to stage that the characteristic shown in FIG. 1B applies to each of the two heads 1 and 2, the track with the tracking signal of the frequency f2 being the track to be followed.

In order to ensure that the heads 1 and 2 follow the desired tracks, the signal S appearing on the output of amplifier 10 is amplified and applied to the transducers 3 and 4 associated with said heads, either the head 1 or 2, whichever reads the track at this instant, being controlled in height as a function of the signal S at said instant. For this purpose the apparatus comprises a change-over switch 13, which connects the output of the amplifier 10 to the input of an amplifier 11 when head 1 is reading, and a change-over switch 14, which connects the output of amplifier 10 to the input of an amplifier 12 when head 2 is reading. The output of amplifiers 11 and 12 are connected to transducers 3 and 4, respectively, via for example slip rings 15 and 16, respectively. In respect of the signal polarities this circuit is dimensioned so that at a positive signal S, the relevant head is controlled to the left and at a negative signal to the right. The switches 13 and 14 are actuated by a timing device 17 in synchronism with the movement of the heads 1 and 2, so that always the correct transducer receives the amplified signal S.

FIG. 1B represents the positions $A_o$ and $B_o$ of the heads 1 and 2, respectively, in the non-controlled condition relative to the discrimination characteristic. As a result of hysteresis and mechanical deviations these positions will not be the same. The average position of the heads 1 and 2, however, is situated on the centre of the track to be followed as a result of the action of any known tape-speed servo-mechanism, not described, which may, for example, compare synchronizing pulses from a synchronisation track with a tacho signal. By means of the tracking mechanism the head 1 is moved to the right along the line of action V in FIG. 1B and head 2 to the left along a similar line of action. The line of action V represents the position of head 1 as a function of the voltage on the input of amplifier 11, while the characteristic S represents said input voltage as a function of the head position. The heads 1 and 2 are then adjusted to the intersection of the associated line of action and the characteristic S. In FIG. 1B these are the positions $A_1$ and $B_1$ respectively corresponding to the values $-V_2$ and $+V_2$ of the signal S.

The head positions A1 and B1 are situated symmetrically relative to that position for which the signal S has the value 0 V, because the initial positions A0 and B0 have such a symmetrical location. If this were not the case, these positions A1 and B1 would not have been symmetrical at the beginning. However, the tape-speed servo-mechanism corrects this in that the tape speed is controlled until the average position of the heads 1 and 2 is situated at the zero point of the characteristic S.

During the scanning of a track by one of the heads 1 and 2, the scanning head is always controlled substantially to the centre of the track. When the tape speed and the head speed are sufficiently constant, the position of the scanning head at the beginning of the track will sooner be in accordance with the position assumed by this scanning head at the beginning of the preceding track followed by this scanning head than in accordance with the position assumed by this scanning head at the end of said preceding track. During the half-revolution period of the head disc in which the scanning head does not read and is thus not controlled in respect of height, it is therefore favourable to control said head towards the position occupied by the head at the beginning of the last track which was read. For this purpose the output of amplifier 10 is connected to a capacitor 21 via a charging resistor 18 and a switch 19, and to a capacitor 22 via the charging resistor 18 and a switch 20. The switches 20 and 19, respectively, are briefly closed on command of the timing device 17 at the beginning of the read-out of a track by either head 1 or 2, respectively, so that the voltage across capacitor 21 or 22 corresponds to the value of the signal S at the beginning of the read out of a track by either head 1 or 2, respectively. Via operational amplifiers 23 and 24, respectively, which are connected as followers, the voltages across capacitors 21 and 22 are applied to the contracts $C_2$ of switches 13 and 14, respectively, the switch 13 or 14, respectively, making contact with the respective contact $C_2$ when either head 1 or 2, respectively, does not read during a half revolution of the head disc. As a result of this, the heads 1 and 2, respectively, and brought to a position corresponding to the position of said heads 1 and 2 at the beginning of the previous read period during the "flyback", i.e. the period during which said heads 1 and 2 alternately do not read.

With the tracking system described the heads may exhibit a difference in mutual height corresponding to four tracks or a multiple of four tracks. These situations are stable and may for example result from an incorrect lock-in at the beginning of reproduction. FIG. 1B shows such a situation, where the uncontrolled positions A2 and B2 of heads 1 and 2, respectively, are indicated symmetrically relative to the track with the tracking signal of the frequency f4, while the discrimination characteristic S, as a result of a frequency f0 of the frequency generator 7, which does not correspond to the actual situation, corresponds to a track to be followed with a tracking signal of the frequency f2. As the values of the signal S correspond to the positions A2 and B2 are positive and negative, respectively, head 1 is controlled to the left and head 2 to the right. The heads 1 and 2 are consequently controlled towards positions A3 and B3, respectively, which positions are substantially four tracks apart and which positions are stable. At the positions A3 and B3 the signal S has the values V1 and $-V1$, respectively.

FIG. 1B shows that when the mutual deviation of the heads 1 and 2 as a result of hysteresis and mechanical tolerances is less than two tracks, in the uncontrolled condition, in other words if the positions Ao and Bo are at any rate situated between the positions Amax and Bmax, the voltage V1 is always greater than the voltage V2. Indeed, the voltage V3=(V1+V2) appears when head 1 is adjusted starting from position Amax. Therefore, when position A0 is always situated within position Amax, the voltage V2 will always be smaller than the voltage V3, while the voltage V1 will always be greater than the voltage V3.

In situations where the initial positions A0 and B0 and positions A2 and B2 respectively are not situated symmetrically, the difference of the values of the signal S corresponding to the controlled conditions of the heads 1 and 2 in the correct positions is always greater than said difference in the case of a relative error of four tracks or a multiplicity of four tracks, provided that the mutual initial positions are situated less than two tracks apart. The tracking method in accordance with the invention utilizes this datum. In the selected embodiment the values of the signal S at the beginning of the read-out of a track by head 1 and head 2 are available across capacitors 21 and 22, respectively. In order to determine the difference in values of the signal S, effective use can then be made of said initial values. In the apparatus of FIG. 2 the outputs of followers 23 and 24 are therefore connected to inputs of a differential amplifier 25. Thus, a signal whose value corresponds to the difference between the initial values of the signal S is available on the output of said differential amplifier 25. This output signal is delayed by RC-network 26, 27, and is applied to a threshold circuit 28 having a threshold which corresponds to the value 2V3.

In accordance with the invention the undesired situation with the heads 1 and 2 at positions A3 and B3 may be eliminated by applying to the transducer of one of the two heads the voltage applied to the transducer of the other head. In the example described with reference to FIG. 1B, the voltage applied to the transducer of head 2 is applied to the transducer of head 1. As a result of this head 1 moves from position A3 to position A4 which position, when ignoring hysteresis effects, is then situated at the same distance to the right of the initial position A2 as the head 2 is situated to the right of B2 and, if the imposed requirement is met, this will be at less than two tracks from the position B3 of head 2. The tracking mechanism then moves head 1 from position A4 to the right along the line of action up to position A5. The two heads 1 and 2 are then situated to the left of the track with the tracking frequency f2. By changing the tape speed, the tape speed serve mechanism will control the average position of the heads 1 and 2 symmetrically relative to the track, so that ultimately the positions A6 and B6 are reached, which is again a stable situation.

In the example of FIG. 2 the foregoing is achieved in that a switch 29 is included between the output of the follower 24 and the capacitor 21. The switch is actuated by the output signals of the threshold circuit 28 and is closed when the input signal of the threshold circuit 28 exceeds the said level 2 V3.

By closing switch 29, capacitor 21 is charged to the same voltage as capacitor 22, so that during the flyback of head 1 said head 1 is moved to position A4 by transducer 3, after which during read-out of the next track by head 1 this head is moved to position A5 and, simultaneously but more slowly, is moved to position A6 by the tape serve mechanism.

After switch 29 has closed, the output signal of differential amplifier 25 becomes 0 V. This is below the threshold 2 V3 of threshold circuit 28, so that switch 29 opens again. RC network 26, 27 delays the output signal of differential amplifier 25 so as to prevent switch 29 from being opened prematurely after being closed on command of the threshold circuit 28.

As stated previously, hysteresis plays a part in the movement of head 1 from position A3 to position A4. For example, as a result of hysteresis head 1 could arrive from position A3 at a position to the left of the position A4, the position designated A7 in FIG. 1B, after which the tracking mechanism would again return head 1 to the left which would give rise to an unstable condition. A solution is obtained by subjecting the two heads to substantially the same hysteresis by driving the transducers 3 and 4 fully to one direction for a short time after detection of a deviation in the mutual position. In the example of FIG. 2 this is effected by bringing the inputs of amplifiers 11 and 12 at a high level by connecting the output of threshold circuit 28 to the inputs of amplifiers 11 and 12 respectively, via diodes 30 and 31, respectively. In the desired situation, in which the output voltage of threshold circuit 28 is low, the diodes 30 and 31 isolate the output of said threshold circuit 28 from the amplifiers 11 and 12.

This method of avoiding adverse effects as a result of hysteresis is not optimal, although it is satisfactory for practical purposes. Indeed, it may happen that head 2 is reading at the instant that the transducers 3 and 4 are fully driven to one direction, switch 13 being in the position shown. Transducer 3 then does not receive the same control voltage as transducer 4 receives during the preceding half revolution of the head disc until after the two transducers have been driven and is then still subject to a hysteresis which is no longer corrected. A solution to this problem is the application of the drive pulse to transducer 1 after switch 13 has changed over and makes contact with contact C2.

In the apparatus described the signal available on the capacitor 22 is applied to the capacitor 21 upon the occurrence of an incorrect position of the heads 1 and 2 relative to each other. However, in principle it is also possible to apply the same reference signal to both capacitors 21 and 22 after the occurrence of such an incorrect head position.

The invention is by no means limited to the apparatus described for embodying the said method. The method in accordance with the invention is particularly suitable for being carried out with the aid of a programmable unit, for example a microprocessor. For this purpose the function of the section of the circuit of FIG. 2 within the dotted lines 32 may be performed by means of a microprocessor, the capacitances 21 and 22 being constituted by memory locations. The program of the microprocessor is then such that the values which are each time stored at these memory locations at the beginning of a track scan are compared with each other and that, when these values deviate from each other more than to a predetermined extent, in the memory location corresponding to the capacitance 21 the same value is stored as in the memory location corresponding to the capacitance 22. In addition, an analog-digital or digital-analog converter should be added to the input or output, respectively, of the microprocessor. The function of the switches 19, 20 or 13, 14 is then respectively replaced by the read-in or read-out of said memory locations on command of synchronizing signals.

The said problem of hysteresis may then be solved in a simple manner by the use of a microprocessor. To this end the microprocessor may be programmed for calculating a damped sine wave, which is applied to the transducer via the digital-analog converter at suitable instants. Such a damped wave eliminates hysteresis effects.

What is claimed is:

1. A method of positioning reading and/or writing heads arranged for alternately following consecutive recording tracks of a recording medium in the form of a tape, said tracks being substantially parallel one to the other and form an angle with the longitudinal axis of said recording medium, said method comprising:
   providing a first and a second transducer for positioning said heads, respectively;
   applying a first and a second control signal to said first and second transducers, respectively, for causing said heads to respectively follow a recording track;
   comparing the relative positions of said heads; and
   applying a third control signal, similar to said second control signal, to said first transducer in substitution for said first control signal when the relative positions of said heads differ by more than a predetermined amount.

2. A method as claimed in claim 1, characterized in that the position of the two heads relative to each other is determined by comparing the first and second control signals applied to the first and second transducers with each other and that if the difference between the first and second control signals exceeds a predetermined valve the third control signal for the first transducer is derived from the second control signal for the second transducer.

3. An apparatus for positioning magnetic heads comprising a first and a second head for reading and/or writing information by in turn consecutively following recording tracks, which tracks are substantially parallel to each other and which make an angle with the longitudinal axis of a recording medium in the form of a tape, a first and a second transducer for respectively moving the first and the second head, means for providing a first and a second control signal for said first and second transducers, respectively, causing said heads to respectively follow a recording track, means for detecting whether the difference between the respective positions of the first head and the second head, in a direction transverse to the direction of the recording tracks, exceeds a predetermined value, and correction means for applying a third control signal, corresponding to the second control signal, to the first transducer when said difference exceeds said predetermined value.

4. An apparatus as claimed in claim 3, characterized in that said detecting means compare the first and the second control signal with each other and detect whether the difference between the first and the second control signal exceeds a predetermined value.

5. An apparatus as claimed in claim 3 or 4, characterized in that said providing means comprises means for detecting tracking signals recorded in said record carrier and consecutively read by the first and the second head, and means for deriving therefrom the first and the second control signal, said apparatus further comprising first and second storage means for storing the values of the first and the second control signals each time at the beginning of every period that the first and the second head, respectively, follows a recording track, and first switching means for applying the values stored in the first and the second storage means to the first and second transducers, respectively, during the period consecutive to the period that the first and the second head, respectively, follows a recording track, said correction means being adapted to supply the value stored in the second storage means to the first storage means after said detection means have detected that said predetermined value has been exceeded.

6. An apparatus as claimed in claim 5, characterized in that said detection means comprise a differential amplifier for determining the difference between the values stored in the first and second storage means and a threshold circuit of which an input is connected to an output of the differential amplifier and of which an output is connected to said correction means.

7. An apparatus as claimed in claim 6, characterized in that the first and the second storage means respectively comprise a first and a second storage capacitance, each of which via second switching means is connected to an output of said means for detecting tracking signals recorded in the recording tracks and consecutively read by the first and second heads, for storing the value of the first and the second control signals, respectively, at the beginning of every period that the first and the second head, respectively, follows a recording track, and which first or second storage capacitance is connected to said first switching means via a first and a second isolation amplifier respectively, said correction means being constituted by a switch between the output of the first isolation amplifier and the input of the second isolation amplifier, which switch is actuated by the output signal of the threshold circuit, and inputs of said differential amplifier being connected to outputs of the first and the second isolation amplifier.

8. An apparatus as claimed in claim 7, characterized in that a delay network is included between the differential amplifier and the threshold switch.

9. An apparatus as claimed in claim 3 or 4, characterized in that said detection means and correction means are constituted by a programmable unit.

* * * * *